United States Patent [19]
Sato et al.

[11] Patent Number: 5,825,243
[45] Date of Patent: Oct. 20, 1998

[54] APPARATUS AND METHOD FOR DEMODULATING MULTI-LEVEL SIGNAL

[75] Inventors: Satoshi Sato; Takeshi Imamura, both of Tokyo, Japan

[73] Assignee: Casio Computer Co., Ltd., Tokyo, Japan

[21] Appl. No.: 738,719

[22] Filed: Oct. 28, 1996

[30] Foreign Application Priority Data

Oct. 30, 1995 [JP] Japan ................................. 7-304992

[51] Int. Cl.⁶ .................................................... H03K 9/02
[52] U.S. Cl. ........................ 329/311; 329/300; 375/317; 375/340
[58] Field of Search ................................. 329/311, 300, 329/302, 303; 375/335, 340, 317

[56] References Cited

U.S. PATENT DOCUMENTS 5,287,540  2/1994  Kuusinen ................................. 375/335
5,425,056  6/1995  Maroun et al. ......................... 375/316
5,566,213  10/1996  Carsello ................................. 375/344

FOREIGN PATENT DOCUMENTS

0540359 A2   5/1993   European Pat. Off. .
2276475      9/1994   United Kingdom .
WO 93/24909 12/1993   WIPO .

*Primary Examiner*—Siegfried H. Grimm
*Attorney, Agent, or Firm*—Frishauf, Holtz, Goodman, Langer & Chick

[57] ABSTRACT

A multi-level signal demodulation apparatus includes an A/D converter for converting an input analog signal of which the amplitude is modulated by a multi-level to a digital signal, a memory for storing the digital signal, a threshold generator for calculating plural threshold levels in accordance with the digital signal which is stored in the memory, and a demodulator for demodulating the digital signal which is obtained by the A/D converter in accordance with the plural threshold levels to a signal according to a level of the digital signal.

35 Claims, 8 Drawing Sheets

APPARATUS AND METHOD FOR DEMODULATING MULTI-LEVEL SIGNAL

BACKGROUND OF THE INVENTION

1. Field of the Invention

The present invention relates to an apparatus and method for demodulating a multi-level signal of which the amplitude is modulated by a multi-level.

2. Description of the Related Art

Recently, in the field of radio communication, a multi-carrier modulation system is used to increase a data transmission rate. For example, in Japan, in a radio paging system which is standardized as "RCR STD-43", a four-level FSK (Frequency Shift Keying) is adopted as a signal modulating system. Further, in a case where data is written in recording media such as an optical disk and so on, the multi-carrier modulation system is used to record the data with high density.

In order to demodulate a multi-carrier modulated signal to digital data, generally, a multi-carrier modulated signal is converted to a multi-level voltage signal, that is, a PAM (Pulse Amplitude Modulation) signal by using a frequency discriminator and so on. Then the voltage signal is compared to plural threshold voltages. For example, there are the following two well-known methods for demodulating a four-level FSK modulated signal.

According to a first method, a four-level analog signal is reproduced from a four-level FSK signal by using a frequency discriminator. The reproduced signal is compared with three threshold voltages which are previously set to demodulate to a four-level digital data.

A second method is basically similar to the first method in which the reproduced four-level analog signal is compared with three threshold voltages to demodulate to a four-level digital data. The three threshold voltages are not fixed voltages but are variable voltages interlocking to a received signal. According to the second method, more specifically, a maximum data voltage and minimum data voltage are detected by a detector among four-level analog signals reproduced by the frequency discriminator and the detected voltages at both of levels are output. Between two voltage output terminals of the detector, that is, one output terminal for the maximum data voltage and the other output terminal for the minimum data voltage, four resistors are connected in series. 17%, 50%, and 83% voltages of a potential difference between the maximum data voltage and the minimum data voltage are taken from the connection points of the four resistors. These three intermediate voltages are defined as the three threshold voltages.

According to the first method, the three threshold voltages are fixed respectively. Thus, when a local oscillator includes an offset, that is, when the frequency of a received signal and reproduced signal is not matched with that of the local oscillator, or when there are variations and so on of characteristics of circuit elements composing a frequency discriminator etc., there is a problem that a multi-level signal can not be correctly demodulated. That is, the four-level analog signal should be reproduced by the frequency discriminator such that the four levels of the signal are located by an equal interval and at a just half point between adjacent threshold levels, as shown in FIG. 1A. However, in case there exists a local offset, there is a problem that a total value of the reproduced signal is shifted toward the side of high level or low level. For example, when the total value is largely shifted toward the side of high level, as shown in FIG. 1B, all the signal levels get higher than a third threshold level. The signals which should be inherently demodulated to "10", "01", and "00" are demodulated to "11", "10", and "01", so that the data can not be demodulated correctly.

Further, when there are variations etc. of the characteristics of circuit elements, an amplitude of a four-level reproduced (regenerated) analog signal is distorted totally or partially. FIG. 1C shows an example in a case that an amplitude of the four-level analog signal is distorted totally. In this case, data which should be inherently demodulated to "11" and "00" is demodulated to "10" and "01", so that the data can not be demodulated correctly. FIG. 1D shows an example in a case that an amplitude of the four-level analog signal is distorted partially. In this case, data which should be inherently demodulated to "00" is demodulated to "01", so that the data can not be demodulated correctly.

According to the above-mentioned second method, the three threshold voltages are interlocked to a received signal to be varied. Accordingly, theoretically, in either case there exists a local offset and an amplitude distortion, it is possible to demodulate a multi-level signal correctly. However, an element used for obtaining the three threshold voltages is a resistor. Since it is not evitable that each resistor has more or less distortion of a resistance value, in fact, it is almost impossible to obtain 17%, 50%, and 83% voltages of a potential difference between the maximum data voltage and minimum data voltage for the three threshold voltages. Accordingly, it is assumed that there is an unbalanced amplitude distortion of the four-level analog signal reproduced by the frequency discriminator. Since a first threshold voltage and a third threshold voltage tend to suffer from an effect due to a variation of a resistance value, the first and third threshold voltages get lower than a second level of a received signal or higher than a third level of the received signal. FIG. 1E shows an example in the case that the third threshold voltage is shifted toward the side of high level, as illustrated by a dot-and-dashed line. In this case, data which must be inherently demodulated to "01" is demodulated to "00", so that the data can not be demodulated correctly.

SUMMARY OF THE INVENTION

Accordingly, it is an object of the present invention to provide an apparatus and method for demodulating a multi-level signal which can demodulate a multi-level signal correctly without suffering from an effect due to a variation of the characteristics of circuit elements.

A related object of the present invention is to provide an apparatus and method for demodulating a multi-level signal which are so resistant to an amplitude variation as to demodulate a multi-level signal correctly without shifting a level, even if there is a uniform or unbalanced distortion of an amplitude.

According to a first aspect of the present invention, a multi-level signal demodulation apparatus comprises:

means for converting an input analog signal of which amplitude is modulated by a multi-level to a digital signal;

means for storing said digital signal which is obtained by said converting means;

means for calculating plural threshold data in accordance with said digital signal which is stored in said storing means; and means for demodulating said digital signal which is obtained by said converting means in accordance with the plural threshold data calculated by said calculating means to a signal according to a level of said digital signal.

According to this modulation apparatus, the input analog signal of which amplitude is modulated by a multi-level is converted to the digital signal according to the level of the analog signal. Therefore, it is possible to correctly demodulate a multi-level signal without suffering from an effect due to a variation of the characteristics of circuit elements. Further, it is possible to correctly demodulate without shifting a level even if there is a uniform or unbalanced distortion.

According to a second aspect of the present invention, a multi-level signal demodulation apparatus comprises:

means for converting an input analog signal of which amplitude is modulated by a multi-level to a digital signal;

means for storing said digital signal which is obtained by said converting means where a predetermined requirement is met;

means for calculating plural threshold data to judge a level of said digital signal in accordance with said digital signal which is stored in said storing means; and means for demodulating a newest digital signal which is obtained by said converting means in accordance with the plural threshold data calculated by said calculating means to a signal according to a level of said digital signal, said demodulation means judging that said predetermined requirement is met when said digital signal is at a higher level than a maximum threshold data or at a lower level than a minimum threshold data among said plural threshold data, so that it is possible to correct said digital signal stored in said storing means by using the newest digital signal.

Accordingly, the input analog signal of which amplitude is modulated by a multi-level is demodulated according to the level of the analog signal after converting the analog signal to a digital signal. Further, when the level of the digital signal is higher than the maximum threshold or lower than the minimum threshold, the level of the digital signal is discriminated. Accordingly, it is possible to correctly demodulate without suffering from an effect due to a variation of the characteristics of circuit elements. Further, it is possible to correctly demodulate without shifting a level even if there is a uniform or unbalanced distortion.

According to a third aspect of the present invention, an apparatus according to the second aspect is provided, wherein said storing means stores plural previous digital signals which meet the predetermined requirement.

According to the third aspect, plural previous thresholds are obtained from plural digital signals which have a higher level than the maximum threshold or a lower level than the minimum threshold. Therefore, it is possible to correctly demodulate without suffering from an effect due to a variation of the characteristics of circuit elements. Further, it is possible to correctly demodulate without shifting a level even if there is a uniform or unbalanced distortion.

According to a fourth aspect of the present invention, a multi-level signal demodulation method comprises the following steps of:

converting an input analog signal of which amplitude is modulated by a multi-level to a digital signal;

storing said digital signal which is obtained by said converting step;

calculating plural threshold data in accordance with said digital signal which is stored by said storing step; and demodulating said digital signal which is obtained by said converting step in accordance with the plural threshold data calculated by said calculating step to a signal according to a level of said digital signal.

Accordingly, the input analog signal of which amplitude is modulated by a multi-level is demodulated according to the level of the signal after converting the analog signal to a digital signal. Therefore, it is possible to correctly demodulate without suffering from an effect due to a variation of the characteristics of circuit elements. Further, it is possible to correctly demodulate without shifting a level even if there is a uniform or unbalanced distortion.

According to a fifth aspect of the present invention, a multi-level signal demodulation method comprises the following steps:

converting an input analog signal of which amplitude is modulated by a multi-level to a digital signal;

storing said digital signal which is obtained by said converting step where a predetermined requirement is met;

calculating plural threshold data to judge a level of said digital signal in accordance with said digital signal which is stored by said storing step; and demodulating a newest digital signal which is obtained by said converting step in accordance with the plural threshold data calculated by said calculating step to a signal according to a level of said digital signal, said demodulation step judging that said predetermined requirement is met when said digital signal is at a higher level than a maximum threshold data or at a lower level than a minimum threshold data among said plural threshold data, so that it is possible to correct said digital signal stored by said storing step by using the newest digital signal.

Accordingly, the input analog signal of which amplitude is modulated by a multi-level is demodulated according to the level of the signal after converting the analog signal to the digital signal. Further, when a level of the digital signal is higher than the maximum threshold or lower than the minimum threshold, the level of the digital signal is discriminated. Therefore, it is possible to correctly demodulate without suffering from an effect due to a variation of the characteristics of circuit elements. Further, it is possible to correctly demodulate without shifting a level even if there is a uniform or unbalanced distortion.

According to a sixth aspect of the present invention, a method according to the fifth aspect is provided, in which said storing step comprises a substep of storing plural previous digital signals which meet the predetermined requirement.

According to the sixth aspect, plural threshold values are obtained from plural previous digital signals having a higher level than the maximum threshold or a lower level than the minimum threshold. Therefore, it is possible to correctly demodulate without suffering from an effect due to a variation of the characteristics of circuit elements. Further, it is possible to correctly demodulate without shifting a level even if there is a uniform or unbalanced distortion.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

A preferred embodiment of a multi-level signal demodulation apparatus according to the present invention will now be described with reference to the accompanying drawings.

First Embodiment

Figure 1A:
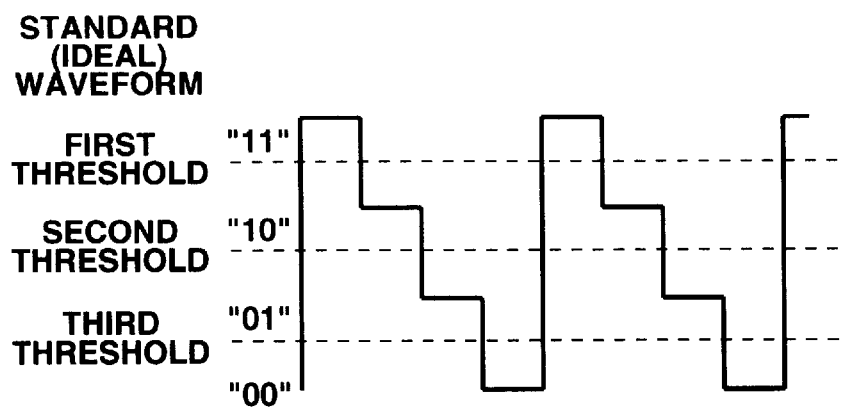
FIGS. 1A–1E show a relationship between a standard waveform of a received signal and a waveform having a local offset or an amplitude distortion.
Figure 1B:
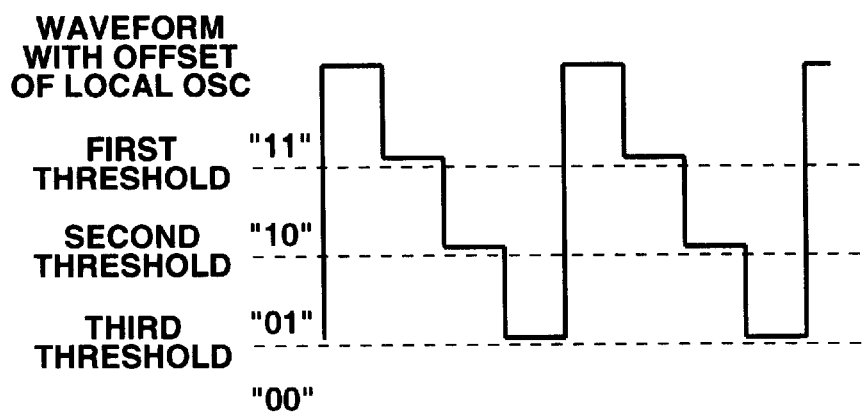
Figure 1C:
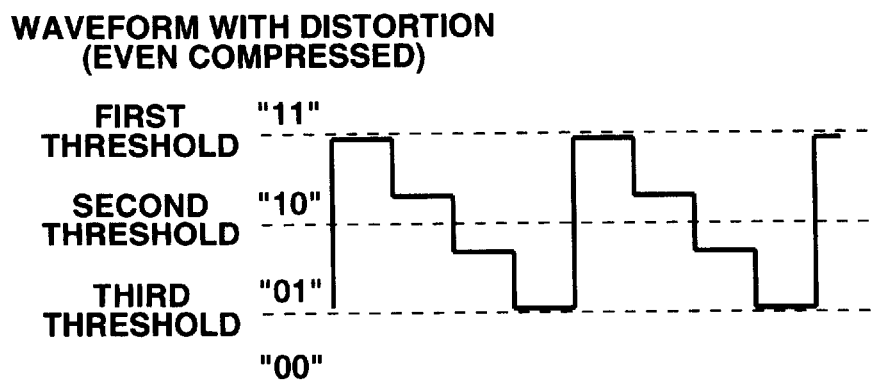
Figure 1D:
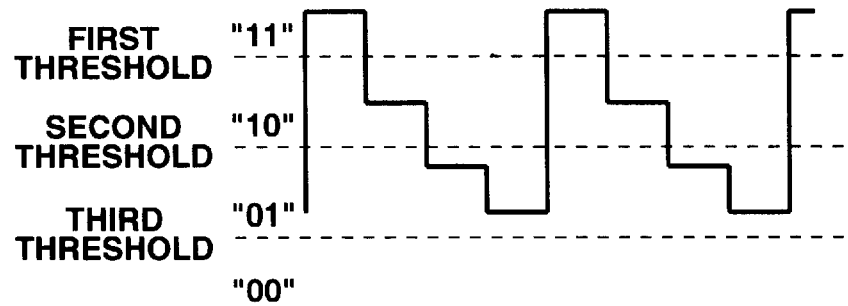
Figure 1E:
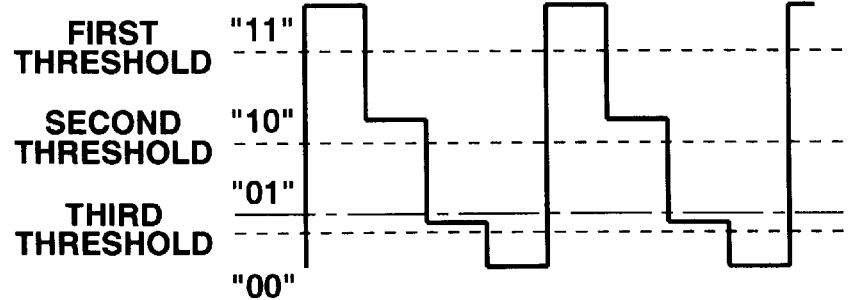
Figure 2:
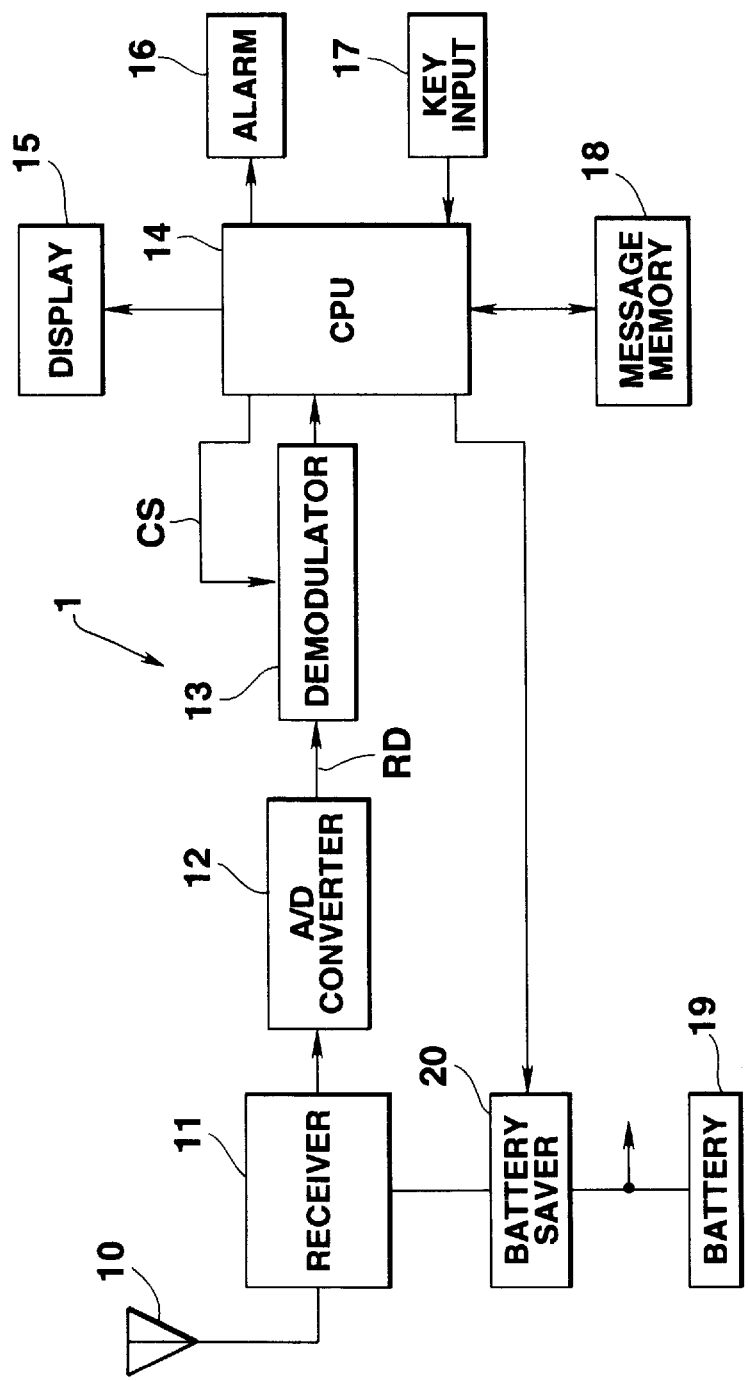
FIG. 2 is a block diagram showing an example of a radio receiver including a multi-level signal demodulation apparatus of the present invention.

FIG. 2 is a block diagram showing an embodiment of a radio receiver including a multi-level signal demodulation apparatus of the present invention. A radio receiver 1 has a function for receiving a message which is used, for example, in a radio paging system. The radio receiver 1 comprises an antenna 10, a receiver portion 11, an A/D converter 12, a demodulator portion 13, a CPU 14, a display portion 15, an alarm portion 16, a key input portion 17, a message memory 18, a battery 19, a battery saver portion 20, and so on.

The antenna 10 receives a radio signal supplied from a base station of a paging service company etc. (not shown) and outputs the received signal to the receiver portion 11. The radio signal from the base station is a radio signal which is modulated with digital data, for example, a four-level FSK signal. The receiver portion 11 includes a frequency discriminator etc. so that a received four-level FSK signal can be reproduced to four-level analog data signal, that is, four-level PAM (Pulse Amplitude Modulation) signal which is supplied to an A/D converter 12. The A/D converter 12 digitizes the four-level analog data signal output from the receiver portion 11 and supplies the digitized signal to the demodulator portion 13. According to the first embodiment, the four-level analog data signal is converted to an 8-bit digital data signal which is to be output. The demodulator portion 13 compares the 8-bit digital data signal output from the A/D converter 12 with three threshold levels (first, second, and third threshold levels as described below). Thereby, demodulated data is obtained in a di-bit form (2-bit unit) and output to the CPU 14. Further, the demodulator portion 13 is also controlled by the CPU 14.

The CPU 14 is a unit, such as a micro computer etc. for controlling an operation of peripheral circuits according to a program which is stored in an internal ROM. The CPU 14 includes a character generator ROM for outputting a character code (a character pattern for display) corresponding to a character, a numeral, a symbol, etc., and a RAM used as a work area in addition to the above-mentioned ROM.

The display portion 15 comprises, for example, a liquid crystal display panel, a display buffer, a driver, etc. to display information such as a message etc. on the liquid crystal display panel. The alarm portion 16 alarms an incoming signal to a user. The alarm portion 16 comprises, for example, an LED (Light Emitting Diode) which is lighted or blinked to alarm the incoming signal, a speaker which sounds the alarm, a vibrator which vibrates for the alarm, and so on. The key input portion 17 comprises input means such as a power source switch, an operation key and so on.

The message memory 18 is a memory for storing a received message data, where the CPU 14 controls write and read of the message data. The battery saver portion 20 controls a power supply from the battery 19 to the receiver portion 11 in accordance with a signal provided from the CPU 14 to save the battery 19 or to reduce power consumption of the battery 19. For example, in a case of a radio receiver in the radio paging system which is adapted to receive only a signal supplied from the base station and having the address thereof, the battery saver portion 20 is operated to supply a power source for the receiver portion 11 only when a signal having the address thereof may be supplied from the radio base station.

Figure 3:
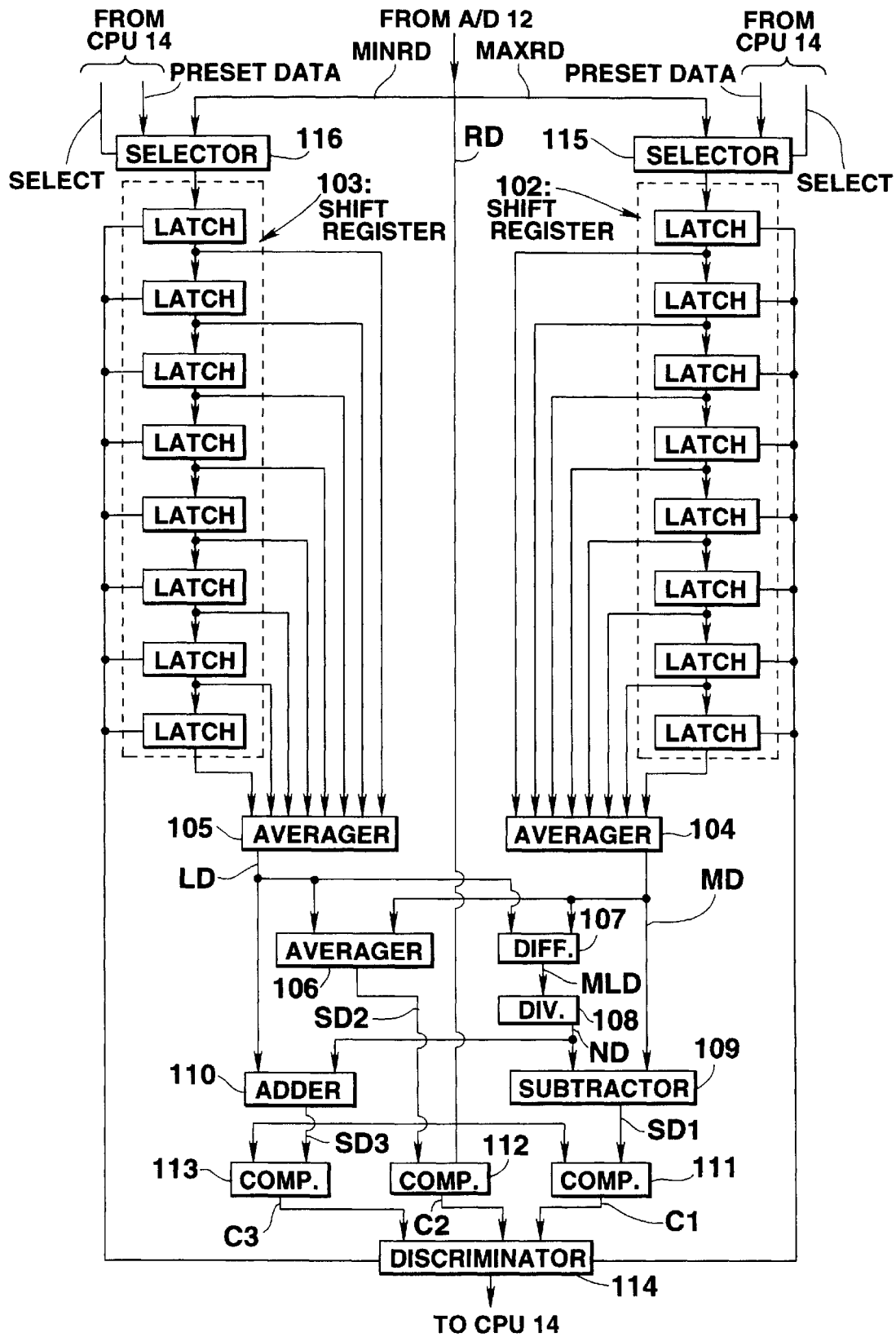
FIG. 3 is a block diagram showing a structure of a demodulator portion of the multi-level signal demodulation apparatus according to the first embodiment of the present invention.

FIG. 3 is a block diagram showing a detailed structure of the demodulator portion 13 shown in FIG. 2. The demodulator portion 13 shown in FIG. 3 is an embodiment of a multi-level signal demodulation apparatus according to the present invention. The demodulator portion 13 comprises shift registers 102 and 103, averagers 104, 105, and 106, a differential circuit 107, a divider 108, a subtractor 109, an adder 110, comparators 111, 112, and 113, a discriminator 114, and selectors 115 and 116.

The shift register 102 is a register for storing M (for example, M=8) previous reproduced data, that is, data which is determined as a maximum value among reproduced data output from the A/D converter 12 by the discriminator 114 (described later). In the first embodiment, eight latch circuits of 8-bit are connected in series. The shift register 102 is connected to the A/D converter 12 and the CPU 14 through the selector 115. The selector 115 outputs data of an appropriate level corresponding to a maximum value from the CPU 14 when a power source of the radio receiver 1 is turned on or when the battery 19 is exchanged. The selector 115 is arranged so that the maximum data are preset in each step of the shift register 102, that is, in eight latch circuits. Accordingly, the shift register 102 is usually connected to the A/D converter 12 through the selector 115. Further, the shift register 102 is operated for shifting by pulse signals PS1 output from the discriminator 114 when the reproduced data from the A/D converter 12 is determined as a maximum value. Accordingly, the reproduced data from the A/D converter 12 is input (or is taken in) as a newest maximum reproduced data MAXRD, and then an oldest maximum reproduced data MAXRD is erased (is shifted out).

The shift register 103 is a register for storing M (for example, M=8) previous reproduced data, that is, data which is determined as a minimum value among reproduced data output from the A/D converter 12 by the discriminator 114. In the first embodiment, eight latch circuits of 8-bit are connected in series. The shift register 103 is connected to the A/D converter 12 and the CPU 14 through the selector 116. The selector 116 outputs data of an appropriate level corresponding to a minimum value from the CPU 14 when a power source of the radio receiver 1 is turned on or when the battery 19 is exchanged. The selector 116 is arranged so that the minimum data are preset in each step of the shift register 103, that is, in eight latch circuits. Accordingly, the shift register 103 is usually connected to the A/D converter 12 through the selector 116. Further, the shift register 103 is operated for shifting by pulse signals PS2 output from the discriminator 114 when the reproduced data from the A/D converter 12 is determined as a minimum value. Accordingly, the reproduced data from the A/D converter 12 is input (or is taken in) as a newest minimum reproduced data MINRD, and then an oldest minimum reproduced data MINRD is erased (is shifted out).

The averager 104 is a circuit for averaging eight previous maximum reproduced data MAXRD stored in the shift register 102 to obtain average data MD. The resultant data is supplied to the subtractor 109, the differential circuit 107, and the averager 106. The averager 105 is a circuit for averaging 8 previous minimum reproduced data MINRD stored in the shift register 103 to obtain average data LD. The resultant data is supplied to the differential circuit 107, the averager 106, and the adder 110.

The differential circuit 107 is a circuit for obtaining a difference between average data MD from the averager 104 and average data LD from the averager 105 to obtain differential data MLD. The resultant data is supplied to the divider 108. The divider 108 is a circuit where differential data MLD from the differential circuit 107 is divided by a constant "6" which is previously set to obtain divided data ND. The resultant data is supplied to the subtractor 109 and the adder 110.

The subtractor 109 is a circuit for subtracting the divided data ND from the divider 108 from the average data MD from the averager 104 to obtain a first threshold data SD1. The resultant data is supplied to the comparator 111. The averager 106 is a circuit for averaging the average data MD from the averager 104 and the average data LD from the averager 105 to obtain a second threshold data SD2. The resultant data is supplied to the comparator 112. The adder 110 is a circuit for adding the divided data ND from the divider 108 to the average data LD from the averager 105 to obtain a third threshold data SD3. The resultant data is supplied to the comparator 113.

The comparator 111 is a circuit for comparing present reproduced data RD from the A/D converter 12 with the first threshold data SD1 from the subtractor 109 to output comparison data C1. The comparison data C1 indicates whether the present reproduced data RD is higher than the first threshold data SD1 or not. The comparison data C1 is supplied to the discriminator 114. The comparator 112 is a circuit for comparing the present reproduced data RD from the A/D converter 12 with the second threshold data SD2 from the averager 106 to output comparison data C2. The comparison data C2 indicates whether the present reproduced data RD is higher than the second threshold data SD2 or not. The comparison data C2 is supplied to the discriminator 114. The comparator 113 is a circuit for comparing the present reproduced data RD from the A/D converter 12 with the third threshold data SD3 from the adder 110 to output comparison data C3. The comparison data C3 indicates whether the present reproduced data RD is higher than the third threshold data SD3 or not. The comparison data C3 is supplied to the discriminator 114.

The discriminator 114 is a circuit for judging which level the present reproduced data RD corresponds to in accordance with each comparison data C1, C2, and C3 from the comparators 111, 112, and 113.

Next, an operation of the apparatus will be explained. A radio signal received by the antenna 10 is converted to a four-level data signal in the receiver portion 11. The data signal is further converted to an 8-bit digital data signal in the A/D converter 12 to be supplied to the demodulator portion 13 shown in FIG. 3. In the demodulator portion 13, three threshold levels SD1–SD3 are calculated in accordance with eight maximum reproduced data MAXRD which are previously stored in the shift register 102 and eight minimum reproduced data MINRD which are previously stored in the shift register 103. The first threshold data SD1 is supplied to the comparator 111 from the subtractor 109. The second threshold data SD2 is supplied to the comparator 112 from the averager 106. The third threshold data SD3 is supplied to the comparator 113 from the adder 110. Accordingly, each digital data signal (the reproduced data) input from the A/D converter 12 is compared with the threshold levels SD1, SD2, and SD3 by corresponding comparators 111, 112, and 113, respectively. Each comparator 111, 112, and 113 outputs each comparison data C1, C2, and C3, respectively, to the discriminator 114.

In the discriminator 114, when all the comparison data C1, C2, and C3 are "1", that is, when the present reproduced data RD is a maximum data higher than the first threshold data SD1, di-bit data "11" is supplied to the CPU 14 as demodulation data and the pulse signal PS1 is output. The pulse signal PS1 is supplied to the shift register 102 as a shift pulse as described in detail below.

In the discriminator 114, when the comparison data C1 is "0", and the comparison data C2 and C3 are "1", that is, when the present reproduced data RD is lower than the first threshold data SD1 and higher than the second threshold data SD2, di-bit data "10" is supplied to the CPU 14 as demodulation data. Further, when the comparison data C1 and C2 are "0", and the comparison data C3 is "1", that is, when the present reproduced data RD is lower than the second threshold data SD2 and higher than the third threshold data SD3, di-bit data "01" is supplied to the CPU 14 as demodulation data. Further, when all the comparison data C1, C2, and C3 are "0", that is, when the present reproduced data RD is a minimum data lower than the third threshold data SD3, di-bit data "00" is supplied to the CPU 14 as demodulation data and the pulse signal PS2 is output. The pulse signal PS2 is supplied to the shift register 103 as a shift pulse.

An operation in a case where the pulse signals PS1 and PS2 are output from the discriminator 114 is explained. As described above, when the present reproduced data RD from the A/D converter 12 is higher than the first threshold data SD1, the discriminator 114 outputs the pulse signal PS1 having a function as shift pulse of the shift register 102. When the present reproduced data RD from the A/D converter 12 is lower than the third threshold data SD3, the discriminator 114 outputs the pulse signal PS2 having a function as shift pulse of the shift register 103.

When the shift register 102 is supplied with the pulse signal PS1, the storage data which is stored in each latch is shifted by one. Thus, the reproduced data RD which is output from the A/D converter 12 and determined as data higher than the first threshold data SD1 by the discriminator 114 is taken in the first latch of the shift register 102 as the newest maximum data MAXRD. At the same time, the oldest maximum data stored in the eighth latch of the shift register 102 is shifted out to be erased. That is, eight maximum reproduced data MAXRD which are output from the shift register 102 to the averager 104 are updated. Thus, the average data MD output from the averager 104 to the subtractor 109, the differential circuit 107, and the averager 106 is changed. The first threshold data SD1 output from the subtractor 109, the second threshold data SD2 output from the averager 106, and the third threshold data SD3 output from the adder 110 are corrected, respectively. These three corrected threshold data SD1, SD2, and SD3 are defined as threshold level when a level of next reproduced data is determined.

Similarly, when the shift register 103 is supplied with the pulse signal PS2, the storage data which is stored in each latch is shifted by one. Thus, the reproduced data RD which is output from the A/D converter 12 and determined as data lower than the third threshold data SD3 by the discriminator 114 is taken in the first latch of the shift register 103 as the newest minimum data. At the same time, the oldest minimum data stored in the eighth latch of the shift register 103 is shifted out to be erased. That is, eight minimum reproduced data MINRD which are output from the shift register 103 to the averager 105 are updated. Thus, an average data LD output from the averager 105 to the differential circuit 107, the averager 106, and the adder 110 is changed. The first threshold data SD1 output from the subtractor 109, the second threshold data SD2 output from the averager 106, and the third threshold data SD3 output from the adder 110 are corrected, respectively. These three corrected threshold data SD1, SD2, and SD3 are defined as threshold level when a level of next reproduced data is determined.

Thus, according to the first embodiment described above, a multi-level amplitude modulated signal such as 4PAM signal etc. is demodulated after the signal is digitized. Further, in the following two cases, the first, second and third threshold values are corrected in accordance with the reproduced data RD, (more specifically, eight previous maximum and minimum data including the reproduced data RD). One case is that the level of the reproduced data RD is higher than the first threshold level (maximum threshold level). The other case is that the level of the reproduced data RD is lower than the third threshold level (minimum threshold level). Accordingly, it is possible to correctly demodulate the multi-level modulated signal without suffering from an effect due to a variation of the characteristics of circuit elements. Further, it is possible to correctly demodulate the multi-level modulated signal without shifting a level even if there is a uniform or unbalanced distortion of amplitude.

Second Embodiment

According to the first embodiment described above, seven arithmetic operation circuits 104–110 and three comparators 111–113 are necessary to demodulate data. Therefore, a circuit construction is more or less complicated. According to the second embodiment, one full adder and plural registers are used to demodulate data.

Figure 4:
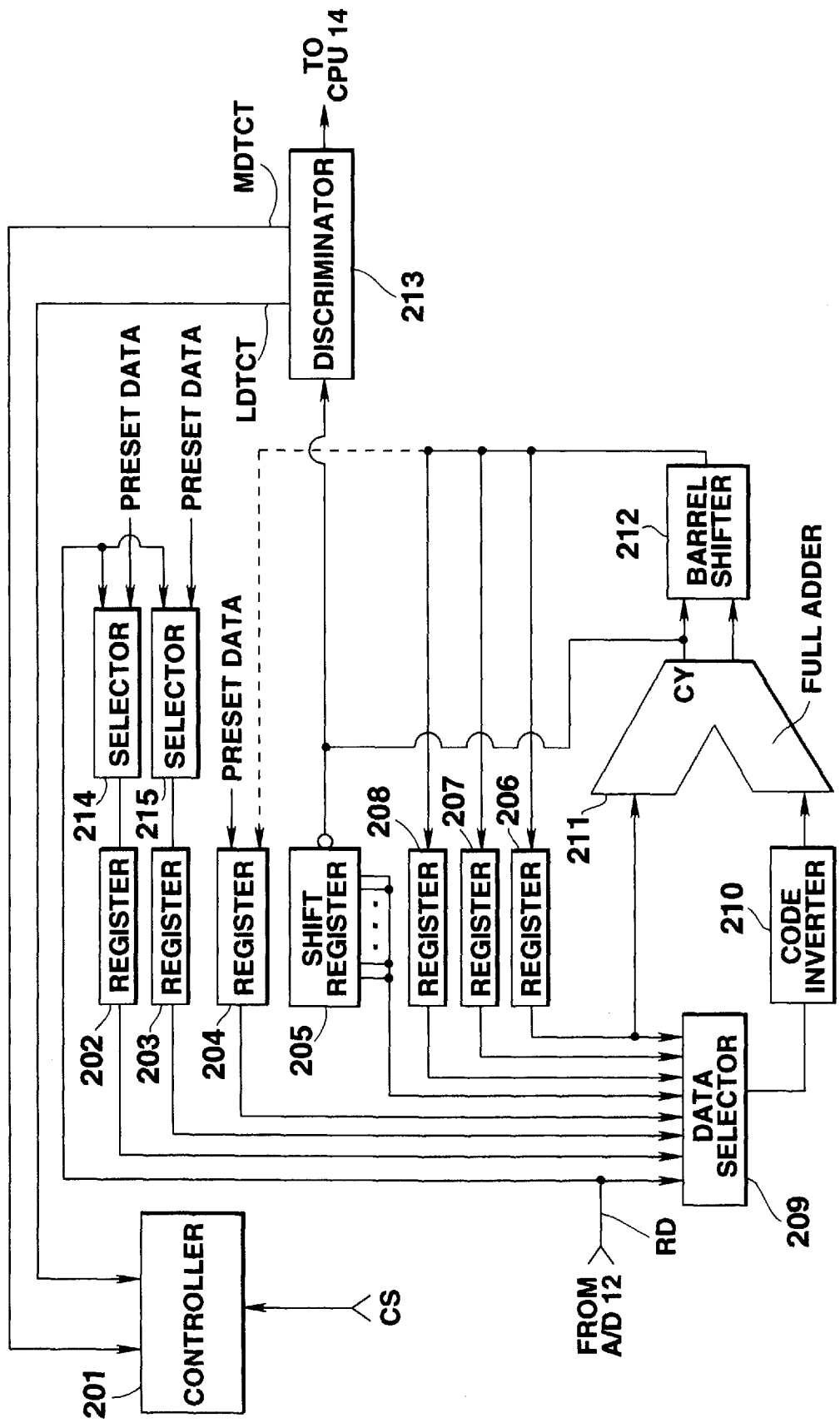
FIG. 4 is a block diagram showing a structure of a demodulator portion of the multi-level signal demodulation apparatus according to a second embodiment of the present invention.

FIG. 4 is a block diagram showing a detailed structure of a demodulator portion according to the second embodiment of the present invention. In FIG. 4, a demodulator comprises, for example, a controller 201, registers 202, 203, 204, 206, 207, and 208, a shift register 205, a data selector 209, a code inverter 210, a full adder 211, a barrel shifter 212, a discriminator 213, and selectors 214 and 215. The demodulator is adaptable to the receiver 1 shown in FIG. 2. In this case, that is, in the case of adapting the demodulator to the receiver 1 shown in FIG. 2, similarly to the demodulator portion 13, the demodulator shown in FIG. 4 is connected between the A/D converter 12 and the CPU 14.

In order to easily understand a demodulation operation, first, a principle of the second embodiment is explained.

As explained in the background of the invention, when there is a local offset, all the levels of a four-level analog signal reproduced by the frequency discriminator etc. are shifted at the side of high level or low level. When there is a variation of the characteristics of circuit elements forming the frequency discriminator etc., an amplitude of a reproduced four-level analog signal is partially or totally distorted. According to the first embodiment, to solve these problems, three threshold levels are obtained in accordance with maximum and minimum data in the reproduced data output from the A/D converter 12. A level of the reproduced data output from the A/D converter 12 is determined in accordance with these three threshold levels. Contrary to the first embodiment, according to the second embodiment, the reproduced data output from the A/D converter 12 is normalized before demodulation. That is, the reproduced data output from the A/D converter 12 is re-scaled so that an average of the maximum value and an average of the minimum value are "E0" and "20", respectively, by hexa-decimal notation.

Figure 5:
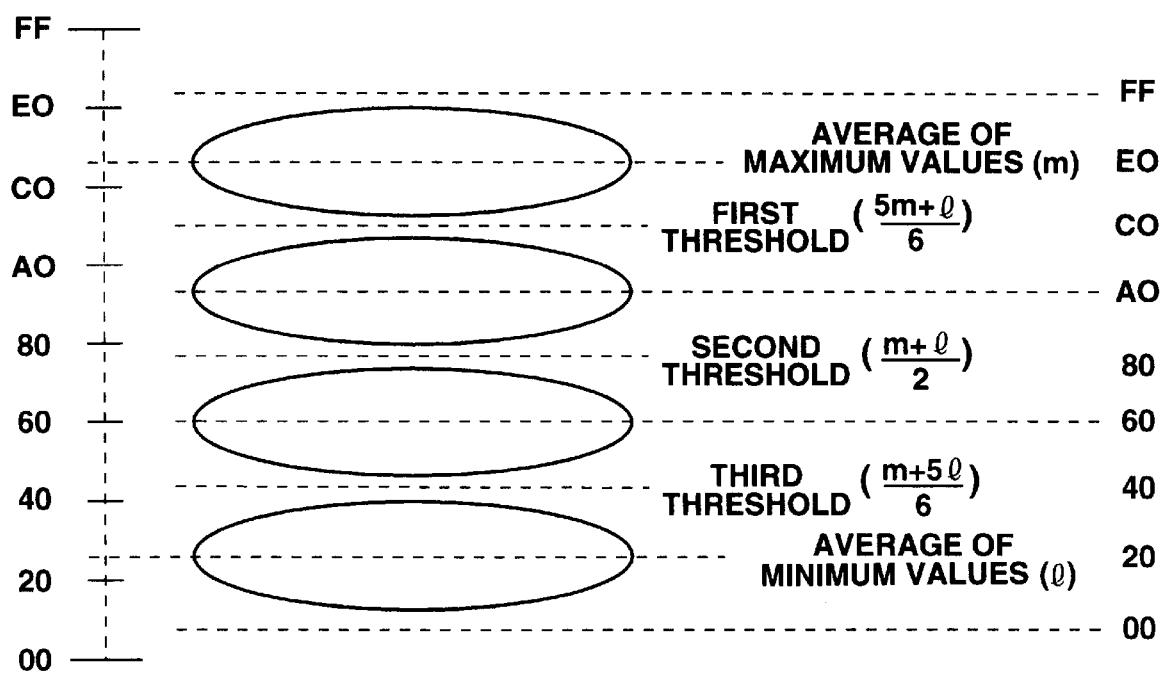
FIG. 5 shows a relationship between a reproduced data, and first, second and third threshold levels of a multi-level signal demodulation apparatus according to the second embodiment of the present invention.

FIG. 5 shows a relationship between a distribution of the level of the reproduced data which is output from the A/D converter 12, normalized values thereof, and three threshold levels. 8-bit reproduced data RD is noted by 256 graduation from $00_H$ to $FF_H$ (where, H means a hexa-decimal notation). FIG. 5 shows an example of 4PAM signal so that the level distribution includes four levels. Therefore, three threshold levels for discriminating the level of the reproduced data are the same as those used in the first embodiment. If the average of the maximum data is represented by m and the average of the minimum data is represented by l, the three threshold data (the first, second, and third threshold data) SL1, SL2, and SL3 are represented as follows:

$$DP = (m - 1)/6 \quad (1)$$

$$SL1 = m - DP \quad (2)$$
$$= (5m + 1)/6$$

$$SL2 = (m + 1)/2 \quad (3)$$

$$SL3 = 1 + DP \quad (4)$$
$$= (m + 51)/6$$

Since the reproduction data RD is normalized so that an average of the maximum value and an average of the minimum value are "E0" and "20", respectively, by hexa-decimal notation, the normalized first to third threshold data SL1, SL2, and SL3 are represented as "C0", "80", and "40" by hexa-decimal notation. After normalization, a virtual lowest value VS ($=00_H$) which is lower than the average 1 of the reproduced data from the A/D converter 12 by a level DP is represented as follows:

$$VS = 1 - DP \quad (5)$$
$$= (71 - m)/6$$

The normalized reproduced data RD, i.e., the re-scaled data SCL is represented as follows:

$$\begin{aligned} SCL &= (RDL - VS)/8 \cdot DP \qquad (6)\\ &= (RDL - (71-m)/6)/8((m-1)/6)\\ &= (6RDL - 71 + m)/8(m-1) \end{aligned}$$

According to the second embodiment, the reproduced data RD from the A/D converter 12 is processed in accordance with the above-mentioned equation (6).

The demodulator portion shown in FIG. 4 for performing the above operation is explained in detail. The demodulator portion 200 comprises a controller 201, registers 202, 203, 204, 206, 207, and 208, a shift register 205, a data selector 209, a code inverter 210, a full adder 211, a barrel shifter 212, a discriminator 213, and selectors 214 and 215. In order to simplify an arithmetic operation, averages of the maximum values and minimum values are not calculated during an operation but the total values thereof are used.

According to the above construction, the controller 201 controls the whole demodulator portion. That is, the controller 201 controls each circuit in accordance with a control signal CS from the CPU 14, a maximum value detection signal MDTCT and a minimum value detection signal LDTCT from the discriminator 213. The registers 202 and 203 are shift registers, each storing m maximum reproduced data MAXRD (similarly to the first embodiment, m=8) and m minimum reproduced data MINRD. Each input of the shift registers 202 and 203 is connected to the data selectors 214 and 215. Similar to the first embodiment, an appropriate level corresponding to the maximum value and the minimum value are preset in the shift registers 102 and 103 by the CPU 14 when a power source of the radio receiver 1 is turned on or when the battery 19 is exchanged. The selectors 214 and 215 are connected to the output terminal of the A/D converter 12. The registers 202 and 203 supply the outputs thereof to the data selector 209. The register 204 is a shift register for storing the first threshold data SD1, the second threshold data SD2, and the third threshold data SD3. The first through third threshold data SD1, SD2, and SD3 are preset by the CPU 14 and output to the data selector 209 when the reproduced data from the A/D converter 12 is discriminated. The first through third threshold data SD1, SD2, and SD3 are typically "C0", "80", and "40" in the hexa-decimal notation, but may be determined for every receiver based on the measured data.

The shift register 205 stores a normalized data, that is, an input data (reproduced data) from the A/D converter 12 which is operated as described below. The input terminal of the shift register 205 is connected to a carry output terminal CY of the full adder 211. The input terminal of the shift register 205 is an inverting input.

The registers 206, 207, and 208 are registers for an arithmetic operation, each connected to an output of the barrel shifter 212. The outputs (12-bit, 11-bit, and 11-bit) of the registers 206, 207, and 208 are connected to the data selector 209. The output of the register 206 is also connected to the full adder 211.

An input of the data selector 209 is connected to an output of the A/D converter 12, and each output of the registers 202, 203, 204, 206, 207, and 208, and the shift register 205. A 12-bit output data to be supplied to the code inverter 210 is selected by the data selector 209 under control of the controller 201. A code of the output data from the data selector 209 is inverted or remains as it is and then supplied to the full adder 211.

The full adder 211 is a circuit for receiving a 12-bit output data from the register 206 and a 12-bit output data from the code inverter 210 to add them together. The adder 211 may perform a subtraction operation if the code inverter 210 inverts the input data. The output of the full adder 211 is connected to the barrel shifter 212 and the shift register 205. The operation resultant data (carry output) CY (1-bit) is supplied to the barrel shifter 212, the shift register 205, and the discriminator 213. The carry output shows whether an operation is completed or not. An operation resultant data (12-bit) is supplied to the barrel shifter 212.

The barrel shifter 212 is a circuit for dividing an output of the full adder 211, that is, the addition or resultant subtraction data by $2^i$ and for multiplying the output of the full adder 211 by $2^i$ in a simple manner. The barrel register 212 is connected to an output of the full adder 211. An addition or resultant subtraction data is output as it is or after shift-down according to mode. That is, the barrel shifter 212 is set to a shift mode or usual mode by the controller 201. In the case of a shift mode, the operation resultant data is shifted down by i bit (where, since m is 8 ($=2^3$), i=3). In case of usual mode, the output data of the full adder 211 is output as it is.

The discriminator 213 is a circuit for judging a level of the reproduced data according to the operation resultant data CY. Similarly to the first embodiment, the 2-bit demodulation data "00", "01", "10", and "11" are obtained corresponding to levels 0, 1, 2, and 3. A maximum detection signal MDTCT and a minimum detection signal LDTCT are supplied to the controller 201 corresponding to detection of the maximum and minimum values.

An operation of the second embodiment is explained. In the demodulator portion shown in FIG. 4, eight maximum reproduced data MAXRD and minimum reproduced data MINRD from the A/D converter 12 are stored in each register 202 and 203, respectively. The first, second, and third threshold data SD1, SD2, and SD3 are stored in the register 204.

The controller 201 first sets a mode of the barrel shifter 212 to the usual mode. Addition operation is implemented to add eight minimum reproduced data MINRD stored in the register 203. Further, the addition operation is also implemented to add eight maximum reproduced data MINRD stored in the register 202. More specifically, in the case of the addition of minimum value, the first minimum reproduced data MINRD from the register 203 is supplied to the full adder 211 through the data selector 209 and the code inverter 210 (which does not invert code). Further, the first minimum reproduced data MINRD supplied to the full adder 211 is supplied to the barrel shifter 212. Thereby, the minimum reproduced data MINRD is stored in the register 206. When the minimum reproduced data MINRD stored in the register 206 is output to the full adder 211, the next minimum reproduced data MINRD is supplied from the register 203 to the full adder 211 through the data selector 209 and the code inverter 210 (which does not invert code). In the full adder 211, the first minimum value (minimum reproduced data MINRD) is added to the next minimum value (minimum reproduced data MINRD). The result (resultant addition data) is supplied to the barrel shifter 212. Thus, the minimum reproduced data MINRD is read from the register 203 to be added to the resultant addition data in turn, so that a total value of eight previous minimum values is obtained. The total value of the minimum values is output from the barrel shifter 212 to the register 208. That is, the register 208 stores the total value of the minimum value.

The eight previous maximum reproduced data MAXRD stored in the register 202 are similarly obtained by an addition operation by the full adder 211. The obtained total value of the maximum value is output from the barrel shifter 212 to the register 207. That is, the register 207 stores the total value of the maximum values. Either an operation for obtaining the total value of the maximum values or an operation for obtaining the total value of the minimum values may be implemented previously.

The total value of the maximum values stored in the register 207 is supplied to the code inverter 210 (which does not invert code) by the data selector 209. The total value is supplied to the register 206 through the full adder 211 and the barrel shifter 212. The total value of the maximum values stored in the register 206 is supplied again to the full adder 211. At the same time, the total value of the minimum values stored in the register 208 is supplied to the code inverter 210 by the data selector 209. The code inverter 210 inverts the code and supplies the inverted data to the full adder 211. In the full adder 211, the code of the total value of the minimum values is inverted, so that the total value of the minimum values is subtracted from the total value of the maximum values. A subtraction total value is supplied to the register 207. That is, the register 207 stores the total value of the subtraction.

The controller 201 shifts the mode of the barrel shifter 212 from the usual mode to the shift mode. Since i=3 (m=8), the shift mode is a mode for shifting down by 3-bit. Thus, after shifting from the usual mode to the shift mode, the total value of the maximum values which is already stored in the register 206 is added to the total value of the minimum values stored in the register 208 by the full adder 211. The resultant addition data is supplied to the barrel shifter 212, where the data is shifted down by 3-bit and output to the register 206. The resultant addition data stored in the register 206 which is shifted down by 3-bit is average data for the total value (additional value) of all the previous eight maximum and minimum values.

The controller 201 shifts the mode of the barrel shifter 212 from the shift mode to the usual mode. The average data stored in the register 206 is read out to be supplied to the full adder 211. At the same time, the total value of the minimum values stored in the register 208 is read out to be supplied to the full adder 211 through the data selector 209 and the code inverter 210 (which inverts code). The full adder 211 subtracts the total value of the minimum values from the average data. The resultant subtraction data is output from the barrel shifter 212 to the register 206. That is, the register 206 stores the data resulting from the subtraction.

At the time of completion of the above operation, storage contents of the registers 206, 207, and 208 are as follows.

Register 206:

$$DR=(8M-7 \cdot 8L)/8 \qquad (7)$$

Register 207:

$$DT=(8M-8L) \qquad (8)$$

Register 208:

$$MINT=8L \qquad (9)$$

where DR is the resultant subtraction data, DT is the total value of the subtraction, and MINT is the total value of the minimum values.

Next, an output from the A/D converter 12 (reproduced data RD) is added to the resultant subtraction data DR stored in the register 206 six times. More specifically, the resultant subtraction data DR stored in the register 206 is supplied to the full adder 211. While, the reproduced data RD from the A/D converter 12 is output from the data selector 209 to the code inverter 210 which does not invert the data. Thus, the reproduced data RD is supplied to the full adder 211 as it is. The full adder 211 implements the first operation for adding the resultant subtraction data DR and the reproduced data RD. The resultant addition data is output from the barrel shifter 212 to the register 206. Since the reproduced data RD is added six times, the first addition data is output from the register 206 to the full adder 211 so that the reproduced data RD is added to the first addition data. The resultant addition data is re-stored in the register 206, then similarly, the reproduced data RD is repeatedly added six times. Thus, after the six-time addition is completed, the last addition data stored in the register 206 is represented as follows:

Register 206:

$$AR=6RD+(8M-7 \cdot 8L)/8 \qquad (10)$$

where AR is the resultant addition data.

Next, the resultant addition data (resultant addition data AR stored in the register 206) is divided by the subtraction total value stored in the register 207. This is an arithmetic operation shown in the above equation (6). More specifically, the following operations (a) and (b) are repeated a predetermined p times (p is a natural number).

(a) First, the resultant addition data AR is read out from the register 206 to be output to the full adder 211 and the data selector 209. The resultant addition data AR output to the data selector 209 is supplied to the full adder 211 through the code inverter 210 (which does not invert code). The full adder 211 is operated to add the same data, that is, the two resultant addition data AR so that the added data is output to the register 206 by the barrel shifter 212. The register 206 stores the doubled resultant addition data AR (referred to as the resultant addition data AR2 below).

(b) Secondly, the resultant addition data AR2 stored in the register 206 is supplied to the full adder 211. While, the subtraction total value DT stored in the register 207 is read out to be output to the data selector 209 and the code inverter 210 (which inverts code). The output of the code inverter 210 is supplied to the full adder 211. The full adder 211 is operated so that the subtraction total value DT is subtracted from the resultant addition data AR2. The resultant subtraction data obtained by the above operation is supplied to the register 206 by the barrel shifter 212 in the case where correct operation is completed without borrowing. Thus, in case of the correct operation, the register 206 stores the operation resultant data. On the other hand, when the correct operation is not implemented due to the occurrence of borrowing, the operation resultant data is not stored in the register 206. The resultant addition data AR2 which is currently stored in the register 206 is held so that the operation resultant data CY (="1", 1-bit) is output to the shift register 205. The shift register 205 inverts an input so that "0" is stored when the operation resultant data CY is "1". The above predetermined times (p) is according to a multiplicity of a signal which is due to be demodulated. In case of four-level demodulation, it is possible to set the predetermined times (p) arbitrarily, if multiplicity is not less than 2. In practice, preferably, the predetermined times (p) corresponds to the output bit number of the A/D converter 12 (m=8 in this case).

The previous eight operation resultant data stored in the shift register 205, i.e., the normalized reproduced data RD from the A/D converter 12 is read out to be supplied to the register 206 through the data selector 209, the code inverter 210 (which does not invert code), the full adder 211, and the barrel shifter 212. Further, the 8-bit normalized data is read out from the register 206 to be supplied to the full adder 211. While, the third threshold data SD3 is read out from the register 204 to be supplied to the full adder 211 through the data selector 209 and the code inverter 210 (which inverts code). In the full adder 211, the third threshold data SD3 is inverted so that the third threshold data SD3 is subtracted from the normalized data. The operation resultant data CY representing the operation result is supplied to the discriminator 213. Similarly, the second and first threshold data RD2 and RD1 are read out from the register 204 to be subtracted from the normalized data. In any case, the resultant operation data is supplied to the discriminator 213. In the discriminator 213, it is determined that the level of the normalized data is either of levels 0–3 by comparing with the input data CY, i.e., the threshold levels.

It is assumed that CY0 is the comparison result compared to the third threshold level, CY1 is the comparison result compared to the second threshold level, and CY2 is the comparison result compared to the first threshold level. A relationship between CY0, CY1, and CY2 and the level value is as follows:

Where CY0=0, CY1=0, and CY2=0, the level is 0 (minimum level),
where CY0=1, CY1=0, and CY2=0, the level is 1,
where CY0=1, CY1=1, and CY2=0, the level is 2, and
where CY0=1, CY1=1, and CY2=1, the level is 3 (maximum level)

When the maximum level is detected, that is, the discriminator 213 determines that the present reproduced data RD is higher than the first threshold data SD1, 2-bit data whose 1-bit maximum detection data MDTCT and 1-bit minimum detection data LDTCT are "1" and "0", respectively, is supplied to the controller 201. The present reproduced data RD producing this result is stored in the register 202 as a maximum reproduced data MAXRD by the controller 201. Since the register 202 stores the input maximum reproduced data MAXRD newly, the oldest maximum reproduced data MAXRD is erased. When the minimum level is detected, that is, the discriminator 213 determines that the present reproduced data RD is lower than the third threshold data SD3, 2-bit data whose 1-bit maximum detection data MDTCT and 1-bit minimum detection data LDTCT are "0" and "1", respectively, is supplied to the controller 201. The present reproduced data RD producing this result is stored in the register 202 as a minimum reproduced data MINRD by the controller 201. Since the register 202 stores the input minimum reproduced data MINRD newly, the oldest minimum reproduced data MINRD is erased.

Thus, according to the second embodiment described above, the arithmetic operation circuit comprises only one full adder 211. Therefore, it is possible to simplify the arithmetic operation circuit compared to the first embodiment. Further, by using the register, data can be held for division and comparison by shifting, it is possible to correctly demodulate the multi-level signal whose linearity is wrong without shifting the signal level.

It is possible to replace the registers 202, 203, and 204 as the shift register by RAM to omit a space for the registers. The controller 201 is realized by a random gate. However, the controller 201 can comprise ROM so that it is possible to demodulate a multiplied multi-level signal in addition to 4-level signal.

According to the second embodiment described above, the 8-bit operation resultant data stored in the shift register 205 is compared with the first, second, and third threshold data SD1, SD2, and SD3. However, the upper-bit (2-bit or 3-bit) values of the shift register 205 can be directly supplied to the discriminator 213 to be judged. That is, it is assumed that the first through third threshold data are "C0", "80", and "40". If the upper 2-bit is "11", the level of the demodulated signal is 3. If the upper 2-bit is "10", the level of the demodulated signal is 2. If the upper 2-bit is "01", the level of the demodulated signal is 1. If the upper 2-bit is "00", the level of the demodulated signal is 0.

In the above second embodiment, as an example, eight previous maximum reproduced data MAXRD and eight minimum reproduced data MINRD are used. Accordingly, the barrel shifter 212 shifts down by 3-bit to obtain the average data thereof in case of the shift mode. In case of four previous data MAXRD and MINRD, where i=2, the barrel shifter 212 shifts down by 2-bit.

It is possible to correct the first, second, and third threshold data RD1, RD2, and RD3 stored in the register 204 interlocking with the reproduced data RD input from the A/D converter 12. That is, when the data of the register 202 or 203 is updated, the first, second, and third threshold data RD1, RD2, and RD3 stored in the register 204 are changed or corrected by an arithmetic operation. This modification will be explained below.

The first, second, and third threshold data are defined as RD1', RD2', and RD3', respectively. The first, second, and third threshold data RD1', RD2', and RD3' are represented as follows:

$$RD1' = (5 \cdot 8M + 8L)/(8 \times 6) \qquad (11)$$
$$= (5 \cdot 8M + 8L)/(16 \times 3)$$

$$RD2' = (8M + 8L)/(8 \times 2) \qquad (12)$$
$$= (8M + 8L)/(16)$$

$$RD3' = (8M + 5 \cdot 8L)/(8 \times 6) \qquad (13)$$
$$= (8M + 5 \cdot 8L)/(16 \times 3)$$

It is assumed that eight minimum reproduced data MINRD stored in the register 203 have been transferred to the register 206 when the maximum reproduced data MAXRD stored in the register 202 is updated. Similarly to the second embodiment described above, the register 208 and the full adder 211 add the maximum reproduced data MAXRD in the updated register 202. The resultant addition maximum value is stored in the register 207.

In order to obtain the second threshold data RD2', the resultant addition data of the maximum value stored in the register 207 is transferred to the register 206. In this case, the controller 201 sets the barrel shifter 212 to 4-bit shift mode. The 4-bit shift corresponds to the division by a denominator (=16) shown in the above equation (12). Thus, the resultant addition data of the maximum value stored in the register 206 is added to the resultant addition data of the minimum value stored in the register 208 by the full adder 211. The resultant addition data is shifted by 4-bit in the barrel shifter 212 so that the resultant addition data is stored as the second threshold data RD2' in the register 204. Then, the controller 201 shifts the barrel shifter 212 to the usual mode.

In order to obtain the first threshold data RD1', the resultant addition data of the maximum value stored in the register 207 is transferred to the register 206. The same resultant addition data as the maximum value stored in the registers 206 and 207 are added in the full adder 211. The resultant addition data is output to the register 206. The resultant addition data stored in the register 206 is added to the resultant addition data stored in the register 207 in the full adder 211. The resultant addition data is stored in the register 206. The above operations are repeated three times. Further, after the controller 201 shifts the barrel shifter 212 to the 4-bit shift mode, the resultant addition data by an operation 5·8M stored in the register 206 is added to the resultant addition data of the minimum value stored in the register 208 in the full adder 211. The resultant addition data is supplied to the barrel shifter 212 so that an operation corresponding to 5·8M+8L is completed. The resultant addition data output to the barrel shifter 212 is shifted down by 4-bit according to 4-bit shift mode to be output to the register 206. Thereby, an operation corresponding to (5·8M+8L)/16 is completed. The controller 201 resets the barrel shifter 212 to the usual mode.

Further, the resultant addition data stored in the register 206 is divided by three so that an operation (5·8M+8L)/(16× 3) which corresponds to equation (11) is completed. More specifically, after the following operations (A) and (B) are repeated at a predetermined times, an operation (C) is implemented so that the above operation is completed.

That is, (A) the significant bit representing three is subtracted from the most significant bit of the resultant addition data stored in the register 206 (the initial value: (5·8M+8L)/16), which corresponds to that three is subtracted from the resultant addition data. Whether correct subtraction is operated or not is determined by whether there is a borrow or not. Without the occurrence of a borrow, the correct subtraction is considered to be operated. When the 1-bit operation resultant data CY (="1") is output to the register 205, the resultant subtraction data is transferred from the barrel shifter 212 to the register 206. With occurrence of a borrow, when the 1-bit operation resultant data CY (="0") is output to the register 205, the data which is currently stored in the register 206 is held.

Next, (B) the data stored in the register 206 is directly output to the full adder 211 as well as the data stored in the register 206 is indirectly output to the full adder 211 through the data selector 209 and the code inverter 210 (which does not invert code). The full adder 211 adds these data for outputting the resultant addition data to the register 206. Thereby, the resultant addition data stored in the register 206 is updated to be double original data stored in the register 206. The number of repeating operations (A) and (B) is set according to the multiplicity of a signal which is to be demodulated. In the case of demodulating a four-level multi-level signal, when the multiplicity is not less than 2, the operation is repeated arbitrarily. In practice, preferably, the number of repetitions corresponds to the output bit number of the A/D converter 12.

(C) Finally, the 8-bit operation resultant data stored in the register 205 is output to the register 204 so that the first threshold data RD1' can be corrected.

The third threshold data RD3' is similar to the first threshold data RD1' described above. The resultant addition of the minimum value stored in the register 208 is implemented for the operation corresponding to 5·8L by using the register 206 and the full adder 211. Thereby, the resultant addition data is stored in the register 206. Further, the resultant addition data (8M) of the maximum value stored in the register 207 is added to the resultant addition data (5·8L) of the minimum value stored in the register 206. The resultant addition data is stored in the register 206 so that the operation corresponding to 8M+5·8L is completed. Next, the barrel shifter 212 is changed to the 4-bit shift mode so that the resultant addition data (8M+5·8L) stored in the register 206 is shifted down by 4-bit for storing the resultant addition data in the register 206. Thereby, the operation corresponding to (8M+5·8L)/16 is completed. The operation corresponding to equation (13) is implemented so that the last data ((8M+5·8L)/16) stored in the register 206 is divided by three. The operations (A), (B), and (C) for obtaining the first threshold data RD1' are adopted to obtain the operation result by the equation (13) in the register 206. Therefore, the 8-bit operation resultant data stored in the register 205 is transferred to the register 204 as the third threshold data RD3'.

Even if the first, second, and third threshold data are corrected interlocking with change of the maximum or minimum value, it is possible to obtain the same effect as the second embodiment described above.

Third Embodiment

According to the second embodiment described above, when the discrimination result is not either the maximum or minimum data, the data in the register 202 or 203, or the register 207 or 208 is not updated. It is possible to use an intermediate level to update the threshold level. Further, according to the second embodiment, the data except the threshold data is changed when demodulating. On the other hand, according to the third embodiment, the threshold data is changed after demodulation. The whole construction of the third embodiment is similar to the construction in FIG. 2. The demodulator portion according to the second embodiment shown in FIG. 4 is partially changed. Accordingly, the same circuit elements as the circuit elements in FIG. 4 have the same reference numerals and the explanation thereof is omitted.

Figure 6:
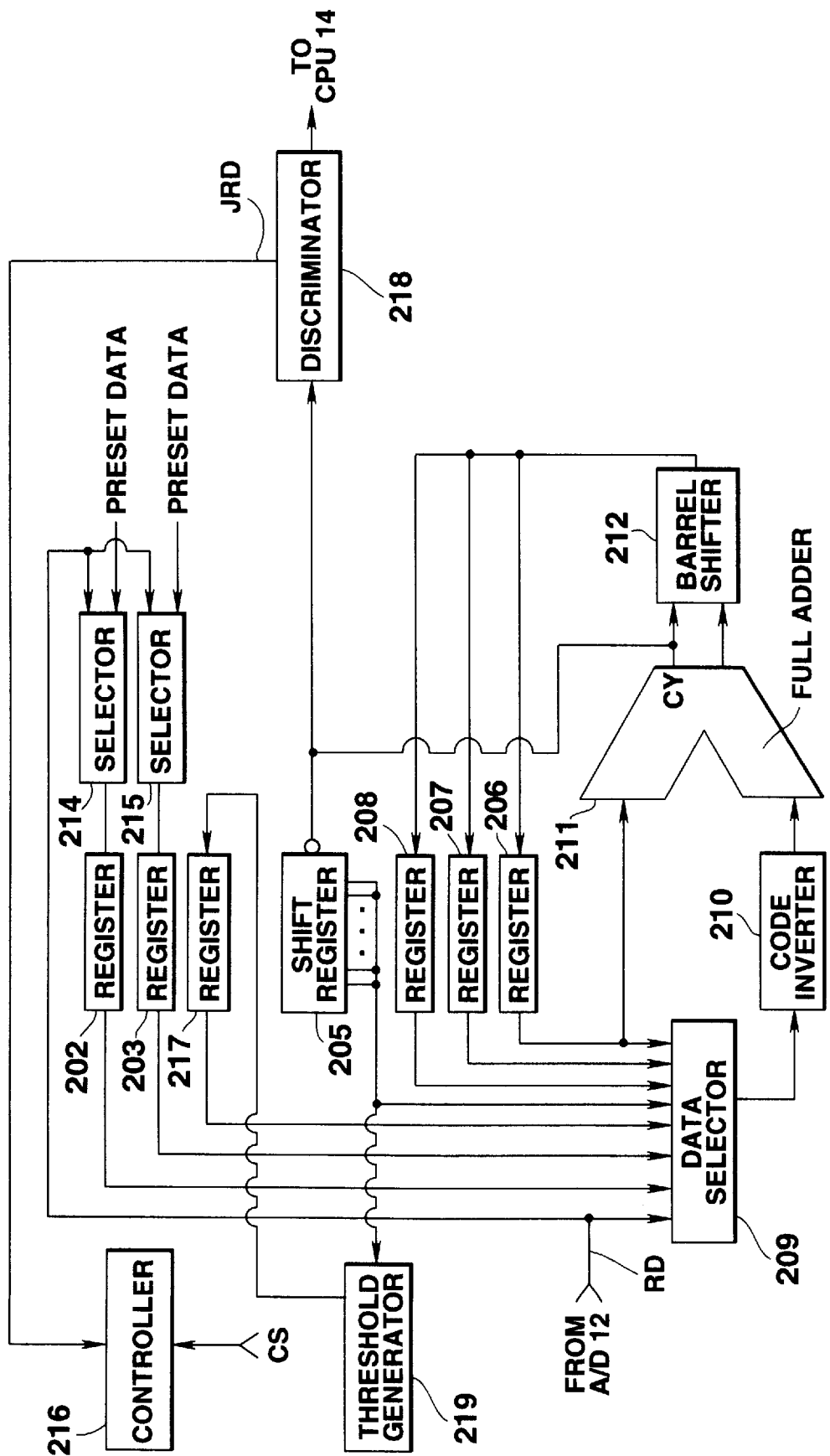
FIG. 6 is a block diagram showing a structure of a demodulator portion of a multi-level signal demodulation apparatus according to a third embodiment of the present invention.

FIG. 6 is a block diagram showing a structure of a demodulator portion according to the third embodiment. A demodulator portion in FIG. 6 is adopted to the receiver 1 shown in FIG. 2. Similarly to the demodulator portion 13 in FIG. 2, the demodulator portion is connected to the A/D converter 12 and the CPU 14.

The demodulator portion comprises, for example, registers 202, 203, 206, 207, and 208, a shift register 205, a data selector 209, a code inverter 210, a full adder 211, a barrel shifter 212, data selectors 214 and 215, a controller 216, a register 217, a discriminator 218, and a threshold generator 219.

In a circuit differed from the circuit in FIG. 4, the controller 216 not only controls an operation of each circuit in FIG. 6 but also controls a change operation based on a total judge resultant data JRD from the discriminator 218. Similarly to the register 204 described above, the register 217 stores the first, second, and third threshold data RD1, RD2, and RD3 so that its input is connected to the threshold generator 219. Similarly to the above-mentioned discriminator 213, the discriminator 218 determines the level of the present reproduced data RD according to the value of the operation resultant data CY. The total judge resultant data JRD is supplied to the controller 216.

The threshold generator 219 comprises a memory for storing the three threshold data to be preset to the shift register 217 as the initial data, a memory for respectively storing the normalized four levels, and an arithmetic operation portion for obtaining the average of two data. The input and output of the threshold generator 219 are connected to the shift register 205 and the register 217, respectively. The threshold generator 219 generates three threshold data, that is, the first threshold data SD1", the second threshold data SD2", and the third threshold data SD3" in order of higher level.

Next, an operation is explained. The modulation portion shown in FIG. 6 is similar to the modulation portion shown in FIG. 4. Whenever each of the operation resultant data CY0, CY1, and CY2 is supplied to the discriminator 218, that is, whenever the discrimination result is obtained, the 8-bit normalized data stored in the shift register 205 is supplied to the threshold generator 219. The data is stored in a corresponding area of the memory which is divided into four areas based on the levels. After the demodulation is completed, (which corresponds to unreceiving period in a communication receiver such as a pager receiver etc.), the arithmetic operation portion in the threshold generator 219 calculates the average of the normalized data stored in each area of the memory. The average includes a maximum average data corresponding to the level 3, a first intermediate average data corresponding to the level 2, a second intermediate average data corresponding to the level 1, and a minimum average data corresponding to the level 0.

In the above-mentioned arithmetic operation portion, further, a third intermediate average data between the maximum average data and the first intermediate average data, a fourth intermediate average data between the first and the second intermediate average data, a fifth intermediate average data between the second intermediate average data and the minimum average data are calculated. These third, fourth, and fifth intermediate average data output to the register 217, respectively, as the first threshold data SD1", the second threshold data SD2", and the third threshold data SD3". The register 217 corrects the threshold data based on these first through third threshold data SD1" to SD3".

Thus, according to the third embodiment, it is possible to correct the threshold value, such as even the intermediate threshold value between the maximum value and the minimum value. Accordingly, it is possible to enhance follow-up characteristic to variation of a received multi-level signal. It is possible to allow the follow-up characteristic to get twice as much, for example, in case of four-level signal. The follow-up characteristic can be (n−1) times as much in case of n-level (n≧2) signal. It is to be noted that the memory of the threshold generator 219 may be divided into respective portions corresponding to the levels, or plural memories are provided for the respective levels.

The normalized data at each of four levels is stored in the memory of the threshold generator 219 in the above description. However, it is possible to store the normalized data of the second and third levels, i.e., the first and second intermediate average data. In this case, the respective averages of the first and second intermediate data are calculated first and then the average of these two averages, i.e., the average of the first and second intermediate data are calculated. The resultant average data is the second threshold data. The average is calculated from the difference between the first and second intermediate average data. The resultant average data (referred to as U below) is added to the first intermediate average data. The resultant data is the first threshold data. Further, the average data U is subtracted from the second intermediate average data. The resultant data is the third threshold data. Thus, the first, second, and third threshold data are stored in the register 217 so that correction of the threshold value is completed.

Fourth Embodiment

According to the third embodiment, the circuit is constructed so that the registers 202 and 203 are used to store the eight maximum reproduced data MAXRD and eight minimum reproduced data MINRD. According to the fourth embodiment described below, these registers 202 and 203 are omitted. According to the fourth embodiment, the data is changed after demodulating. The whole construction of the fourth embodiment is similar to that of the first embodiment shown in FIG. 2. The demodulator portion according to the third embodiment shown in FIG. 6 is partially changed. Accordingly, the same circuit elements as the circuit elements in FIG. 6 have the same reference numerals and the explanation thereof is omitted.

Figure 7:
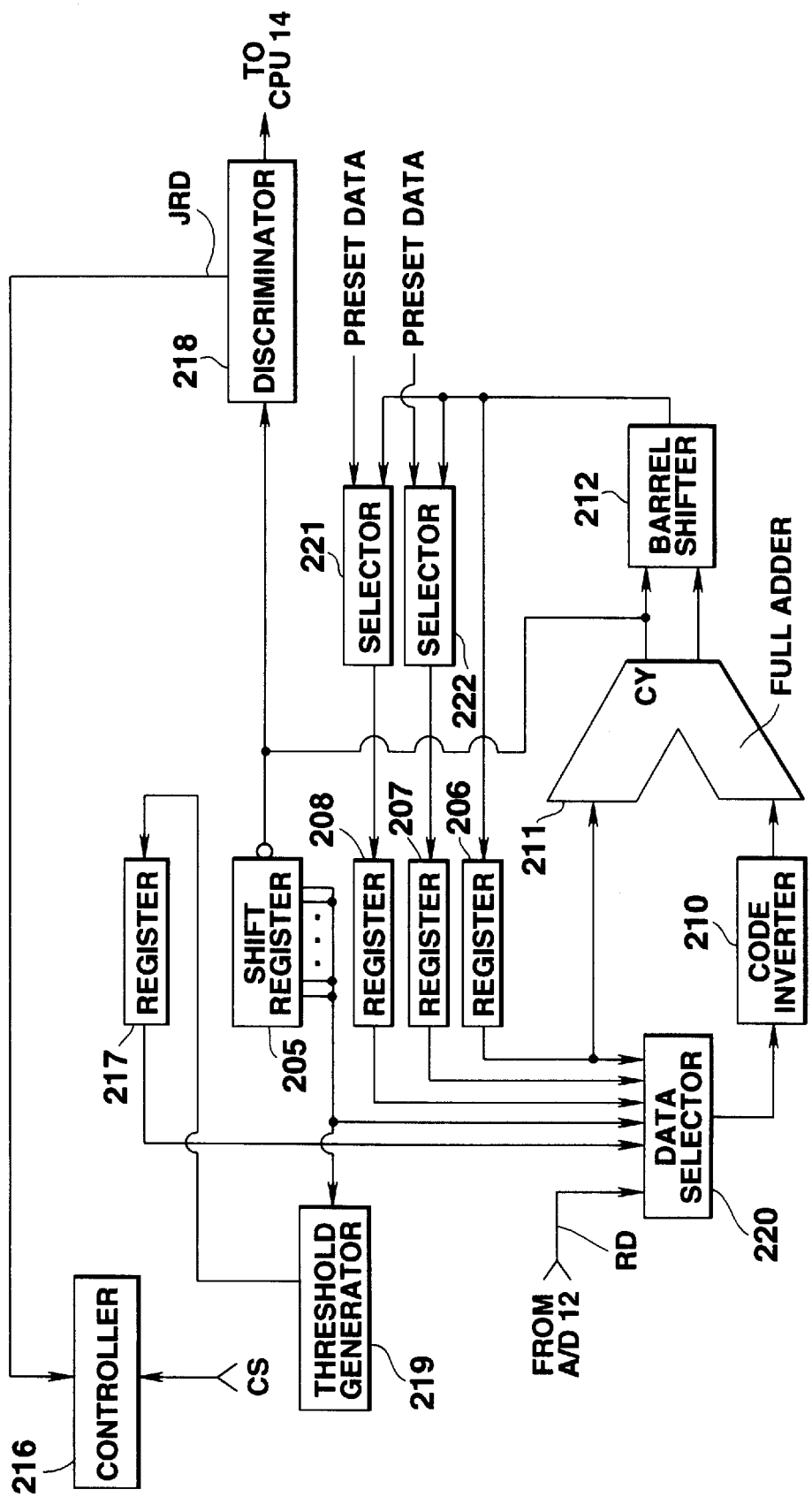
FIG. 7 is a block diagram showing a structure of a demodulator portion of a multi-level signal demodulation apparatus according to a fourth embodiment of the present invention.

FIG. 7 is a block diagram showing a structure of a demodulator portion according to the fourth embodiment. A demodulator portion shown in FIG. 7 is adopted to the receiver 1 in FIG. 2. Similarly to the demodulator portion 13, the demodulator portion of the fourth embodiment is connected to the A/D converter 12 and the CPU 14.

The demodulator portion shown in FIG. 7 comprises, for example, registers 206, 207, and 208, a shift register 205, a code inverter 210, a full adder 211, a barrel shifter 212, a controller 216, a register 217, a discriminator 218, a threshold generator 219, a data selector 220, and selectors 221 and 222.

In a circuit different from the circuit in FIG. 6, since there are no registers 202 and 203, the input of the data selector 220 is connected to the outputs of the A/D converter 12, the registers 206, 207, 208, and 217, and the shift register 205. The selector 221 stores the total value of the eight previous minimum reproduced data MINRD which it preset to the register 208. The selector 222 stores the total value of the eight previous maximum reproduced data MAXRD which it preset to the register 207. After presetting the initial data to the registers 207 and 208, the selectors 221 and 222 are switched to the barrel shifter 212.

Next, an operation of the fourth embodiment is explained. It is assumed that the resultant addition data of eight previous maximum reproduced data MAXRD and the resultant addition data of eight previous minimum reproduced data MINRD are respectively stored in the registers 207 and 208. This state is the same as a state in the second embodiment in which the additions of the eight previous minimum reproduced data MINRD stored in the register 203 and the eight previous maximum reproduced data MAXRD stored in the register 202 are completed.

Similarly to the second embodiment, the discriminator 218 discriminates four levels. The 2-bit demodulation data is obtained using the operation resultant data CY0, CY1, and CY2.

The total subtraction data DT is stored in the register 207. The total minimum data MINT is stored in the register 208. The total subtraction data DT is read out from the register 207 to be supplied to the register 206 through the data selector 220, the code inverter 210, the full adder 211, and the barrel shifter 212. Thus, the total subtraction data is stored in the register 206. Further, the total minimum data MINT is read out from the register 208 to be supplied to the full adder 211 through the data selector 220 and the code inverter 210 (which does not invert code). Since the total subtraction data from the register 206 is supplied to the full adder 211, the addition operation such as DT+MINT is implemented. The resultant addition data is output from the barrel shifter 212 to the register 207. Thus, the resultant addition data (DT+MINT) is stored in the register 207.

The data stored in the registers 207 and 208 are changed to 8M and 8L, respectively. Since the discriminator 218 supplies the total judge resultant data JRD to the controller 216, the controller 216 controls an operation in accordance with the level. The judge resultant data JRD is 2-bit data "00", "01", "10", or "11" according to the level 0 (minimum), level 1, level 2, or level 3 (maximum). For example, when the judge result of the discriminator 218 is the maximum value, the controller 216 performs a following operation according to the total judge resultant data JRD. First, the barrel shifter 212 is shifted to the shift mode to read the total value 8M of the maximum value stored in the register 207. This read data is inverted in the code inverter 210 so that the data is shifted down by 3-bit in the barrel shifter 212. In the barrel shifter 212, the total value of the maximum value is divided by eight. The resultant division data is output to the register 206. Again, the total value 8M of the maximum value is read out from the register 207 so that the total value 8M is added to the resultant division data stored in the register 206. The resultant addition data is stored in the register 206.

Next, the resultant addition data is read out from the register 206 so that the resultant addition data is added to the present reproduced data RD input from the A/D converter 12 in the full adder 211. The resultant addition data is supplied to the register 207 through the barrel shifter 212. The resultant addition data stored in the register 207 is changed to RD (the present reproduced data)+7M.

In the case that the judge result by the discriminator 218 is the minimum value, the controller 216 performs the following operation according to the total judge resultant data JRD. First, the barrel shifter 212 is shifted to the shift mode to read the total value 8L of the minimum value stored in the register 208. The read data is inverted in the code inverter 210 so that the data is shifted down by 3-bit in the barrel shifter 212. In the barrel shifter 212, the total value of the minimum value is divided by eight. The resultant division data is output to the register 206. Again, the total value 8L of the minimum value is read out from the register 207 so that the total value 8L is added to the division resultant data stored in the register 206. The resultant addition data is stored in the register 206.

Next, the resultant addition data is read out from the register 206 so that the resultant addition data is added to the present reproduced data RD input from the A/D converter 12 in the full adder 211. The resultant addition data is supplied to the register 207 through the barrel shifter 212. The resultant addition data stored in the register 208 is changed to RD (the present reproduced data)+7L.

When the judge result by the discriminator 218 is not either the maximum or the minimum value, no operation is implemented so that the data in each register remains as it is.

Thus, the contents of the registers 207 and 208 are changed according to whether the judge result is the maximum value, the minimum value, or neither maximum nor minimum value. Since correction of the first, second, and third threshold data stored in the register 217 is the same as that of the third embodiment, the explanation thereof is omitted.

Thus, according to the fourth embodiment, the same effect as the third embodiment can be obtained.

According to a first aspect of the present invention, the input analog signal of which amplitude is modulated by a multi-level is converted to the digital signal according to the level of the analog signal. Therefore, it is possible to correctly demodulate a multi-level signal without suffering from an effect due to a variation of the characteristics of circuit elements. Further, it is possible to correctly demodulate without shifting a level even if there is a uniform or unbalanced distortion.

According to a second aspect of the present invention, the input analog signal of which amplitude is modulated by a multi-level is demodulated according to the level of the analog signal after converting the analog signal to a digital signal. Further, when the level of the digital signal is higher than the maximum threshold or lower than the minimum threshold, the level of the digital signal is discriminated. Accordingly, it is possible to correctly demodulate without suffering from an effect due to a variation of the characteristics of circuit elements. Further, it is possible to correctly demodulate without shifting a level even if there is a uniform or unbalanced distortion.

According to a third aspect of the present invention, plural previous thresholds are obtained from plural digital signals which have a higher level than the maximum threshold or a lower level than the minimum threshold. Therefore, it is possible to correctly demodulate without suffering from an effect due to a variation of the characteristics of circuit elements. Further, it is possible to correctly demodulate without shifting a level even if there is a uniform or unbalanced distortion.

According to a fourth aspect of the present invention, the input analog signal of which amplitude is modulated by a multi-level is demodulated according to the level of the signal after converting the analog signal to a digital signal. Therefore, it is possible to correctly demodulate without suffering from an effect due to a variation of the characteristics of circuit elements. Further, it is possible to correctly demodulate without shifting a level even if there is a uniform or unbalanced distortion.

According to a fifth aspect of the present invention, the input analog signal of which amplitude is modulated by a multi-level is demodulated according to the level of the signal after converting the analog signal to the digital signal. Further, when a level of the digital signal is higher than the maximum threshold or lower than the minimum threshold, the level of the digital signal is discriminated. Therefore, it is possible to correctly demodulate without suffering from an effect due to a variation of the characteristics of circuit elements. Further, it is possible to correctly demodulate without shifting a level even if there is a uniform or unbalanced distortion.

According to a sixth aspect of the present invention, plural threshold values are obtained from plural previous digital signals having a higher level than the maximum threshold or a lower level than the minimum threshold. Therefore, it is possible to correctly demodulate without suffering from an effect due to a variation of the characteristics of circuit elements. Further, it is possible to correctly demodulate without shifting a level even if there is a uniform or unbalanced distortion.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A multi-level signal demodulation apparatus comprising:

means for converting an input analog signal having a multi-level to a digital signal;

means for discriminating the level of the digital signal by comparing the digital signal with multiple threshold data corresponding to the multi-level of the input analog signal;

means for averaging first digital signals corresponding to a first level of the multi-level of the input analog signal to produce an averaged first digital signal;

means for averaging second digital signals corresponding to a second level of the multi-level of the input analog signal to produce an averaged second digital signal;

means for determining whether the level of the digital signal which is discriminated by said discriminating means as the first level is deviated from the averaged first digital signal, and whether the level of the digital signal which is discriminated by said discriminating means as the second level is deviated from the averaged second digital signal; and means for adjusting said discriminating means so that a first deviation between the level of the digital signal which is discriminated by said discriminating means as the first level and the averaged first digital signal and a second deviation between the level of the digital signal which is discriminated by said discriminating means as the second level and the averaged second digital signal are compensated for when said determining means determines that the level of the digital signal which is discriminated by said discriminating means as the first level is deviated from the averaged first digital signal and that the level of the digital signal which is discriminated by said discriminating means as the second level is deviated from the averaged second digital signal.

2. A multi-level signal demodulation apparatus according to claim 1, wherein said adjusting means comprises means for correcting the multiple threshold data based on the first deviation and the second deviation.

3. A multi-level signal demodulation apparatus according to claim 1, wherein said adjusting means comprises means for normalizing the digital signal supplied to said discriminating means based on the first deviation and the second deviation.

4. A multi-level signal demodulation apparatus comprising:

means for converting an input analog signal having a multi-level to a digital signal;

means for discriminating the level of the digital signal by comparing the digital signal with multiple threshold data corresponding to the multi-level of the input analog signal, and outputting a signal corresponding to a demodulated analog signal; and means for correcting the multiple threshold data based on a previous digital signal discriminated as a first level and a previous digital signal discriminated as a second level when said discriminating means discriminates the level of the digital signal as the first level or the second level.

5. The apparatus according to claim 4, wherein said correcting means corrects the multiple threshold data based on an average of previous digital signals discriminated as the first level and an average of previous digital signals discriminated as the second level.

6. The apparatus according to claim 4, wherein said correcting means comprises:

first and second memories respectively corresponding to the first and second levels, said memories operating in a first-in, first-out (FIFO) manner and respectively storing plural digital signals;

means for storing the digital signals into said first or second memories when said discriminating means discriminates the level of the digital signal as the first or second level;

means for respectively averaging the digital signals stored in said first and second memories; and means for calculating the multiple threshold data based on average values of the signals stored in said first and second memories.

7. The apparatus according to claim 6, further comprising means for presetting plural digital initial signals into said first and second memories.

8. The apparatus according to claim 4, wherein said first and second levels are minimum and maximum levels.

9. A method of demodulating a multi-level signal, comprises the steps of:

converting an input analog signal having a multi-level to a digital signal;

discriminating the level of the digital signal by comparing the digital signal with multiple threshold data corresponding to the multi-level of the input analog signal, and outputting a signal corresponding to a demodulated analog signal; and correcting the multiple threshold data based on a previous digital signal discriminated as a first level and a previous digital signal discriminated as a second level when said step of discriminating discriminates the level of the digital signal as the first level or the second level.

10. The method according to claim 9, wherein said step of correcting corrects the multiple threshold data based on an average of previous digital signals discriminated as the first level and an average of previous digital signals discriminated as the second level.

11. The method according to claim 9, wherein said step of correcting, comprises:

storing plural digital signals in first and second memories respectively corresponding to the first and second levels when said step of discriminating discriminates the level of the digital signal as the first or second level, said memories operating in a first-in, first-out (FIFO) manner;

respectively averaging the digital signals stored in said first and second memories; and calculating the multiple threshold data based on average values of the signals stored in said first and second memories.

12. The method according to claim 11, further comprises the step of presetting plural digital initial signals into said first and second memories.

13. The method according to claim 9, wherein said first and second levels are minimum and maximum levels.

14. A multi-level signal demodulation apparatus comprises:

means for converting an input analog signal having a multi-level to a digital signal;

means for normalizing the digital signal such that digital signals having a same level are within a predetermined range;

means for discriminating the level of the normalized digital signal by comparing the digital signal with multiple threshold data corresponding to the multi-level of the input analog signal, and outputting a signal corresponding to a demodulated analog signal; and means for correcting a range of normalized values of said normalizing means based on a previous digital signal discriminated as a first level and a previous digital signal discriminated as a second level when said discriminating means discriminates the level of the digital signal as the first level or the second level.

15. The apparatus according to claim 14, wherein said normalizing means normalizes the digital signal with a scale having a first value which is an average of previous digital signals discriminated as the first level and a second value which is an average of previous digital signals discriminated as the second level.

16. The apparatus according to claim 14, wherein said normalizing means comprises:

first and second memories respectively corresponding to the first and second levels, said memories respectively storing plural digital signals; and means for normalizing the digital signal with a scale having a first value which is an average of the digital signals stored in said first memory and a second value which is an average of the digital signals stored in said second memory.

17. The apparatus according to claim 16, further comprises means for presetting plural digital initial signals into said first and second memories.

18. The apparatus according to claim 16, wherein said correcting means comprises means for storing the digital signal into said first or second memory when said discriminating means discriminates the level of the digital signal as the first or second level in a first-in, first-out (FIFO) manner.

19. The apparatus according to claim 14, wherein said normalizing means comprises:

a first memory for storing an accumulated value of N digital signals discriminated as the first level by said discriminating means, wherein N is an integer;

a second memory for storing an accumulated value of N digital signals discriminated as the second level by said discriminating means; and means for normalizing the digital signal with a scale having a first value which is 1/N of the accumulated value of the digital signals stored in said first memory and a second value which is 1/N of the accumulated value of the digital signals stored in said second memory.

20. The apparatus according to claim 19, further comprises means for presetting plural digital initial signals into said first and second memories.

21. The apparatus according to claim 19, wherein said correcting means comprises means for updating the accumulated value of said first or second memory by changing the digital signal output from said converting means to a sum of (N−1)/N of the accumulated value stored in said first or second memory and the digital signal output from said converting means when said discriminating means discriminates the level of the digital signal as the first level or the second level.

22. The apparatus according to claim 14, wherein said first and second levels are minimum and maximum levels.

23. The apparatus according to claim 14, further comprises means for correcting the multiple threshold data based on the normalized digital signal output from said normalizing means.

24. The apparatus according to claim 14, further comprises means for correcting the multiple threshold data based on the normalized digital signal output from said normalizing means when said discriminating means discriminates the level of the digital signal as the first level or the second level.

25. A method of demodulating a multi-level signal, comprises the steps of:

converting an input analog signal having a multi-level to a digital signal;

normalizing the digital signal such that digital signals having the same level are within a predetermined range;

discriminating the level of the normalized digital signal by comparing the digital signal with multiple threshold data corresponding to the multi-level of the input analog signal, and outputting a signal corresponding to a demodulated analog signal; and correcting a range of normalized values from said step of normalizing based on a previous digital signal discriminated as a first level and a previous digital signal discriminated as a second level when said step of discriminating discriminates the level of the digital signal as the first level or the second level.

26. The method according to claim 25, wherein said step of normalizing normalizes the digital signal with a scale having a first value which is an average of previous digital signals discriminated as the first level and a second value which is an average of previous digital signals discriminated as the second level.

27. The method according to claim 25, wherein said step of normalizing comprises the steps of:

storing plural digital signals in first and second memories respectively corresponding to the first and second levels; and normalizing the digital signal with a scale having a first value which is an average of the digital signals stored in said first memory and a second value which is an average of the digital signals stored in said second memory.

28. The method according to claim 27, further comprises the step of presetting plural digital initial signals into said first and second memories.

29. The method according to claim 27, wherein said step of correcting includes the step of storing the digital signal into said first or second memory when said step of discriminating discriminates the level of the digital signal as the first or second level in a first-in, first-out (FIFO) manner.

30. The method according to claim 25, wherein said step of normalizing comprises the steps of:

storing an accumulated value of N digital signals discriminated as the first level by said step of discriminating in a first memory, wherein N is an integer;

storing an accumulated value of N digital signals discriminated as the second level by said step of discriminating in a second memory; and normalizing the digital signal with a scale having a first value which is 1/N of the accumulated value of the digital signals stored in said first memory and a second value which is 1/N of the accumulated value of the digital signals stored in said second memory.

31. The method according to claim 30, further comprising the step of presetting plural digital initial signals into said first and second memories.

32. The method according to claim 30, wherein said step of correcting comprises the step of updating the accumulated value of said first or second memory by changing the digital signal output from said step of converting to a sum of (N−1)/N of the accumulated value stored in said first or second memory and the digital signal output from said step of converting when said step of discriminating discriminates the level of the digital signal as the first level or the second level.

33. The method according to claim 25, wherein said first and second levels are minimum and maximum levels.

34. The method according to claim 25, further comprising the step of correcting the multiple threshold data based on the normalized digital signal output from said step of normalizing.

35. The method according to claim 25, further comprising the step of correcting the multiple threshold data based on the normalized digital signal output from said step of normalizing when said step of discriminating discriminates the level of the digital signal as the first level or the second level.

* * * * *